Patented Oct. 9, 1945

2,386,256

UNITED STATES PATENT OFFICE 2,386,256

MONOCYCLIC MONO-OLEFIN CUPROUS HALIDE AND A PROCESS OF MAKING IT

Lloyd C. Morris, Bartlesville, Okla., assignor to Phillips Petroleum Company, a corporation of Delaware No Drawing. Application April 6, 1942, Serial No. 437,903

12 Claims. (Cl. 260—438)

This invention relates to a process for making certain new hydrocarbon-metal salt complex compounds, and to said compounds per se. More particularly it relates to solid complexes of cyclic olefins with cuprous halides such as cuprous chloride or cuprous bromide.

It is known that complex compounds may be formed by reaction between aliphatic olefins and various metal salts, particularly those of the heavy metals of groups I and II of the periodic system. Such complexes are soluble in various hydrocarbon liquids to a greater or less extent, and are soluble in aqueous reagents which may be used as a source of the metal salt in forming said complexes.

It is also known that conjugated aliphatic diolefins will form solid complex compounds by reaction with such metal salts. These diolefin-metal salt complexes are substantially insoluble both in hydrocarbon liquids and aqueous reagents. The reactions of aliphatic olefins and of aliphatic diolefins with cuprous halides have been studied by many workers and their application to commercial problems suggested.

I have now discovered that cyclic olefins, such as cyclopentene, methyl cyclopentene, cyclohexene, etc., may be caused to react with cuprous halides under certain conditions to form solid complex compounds of definite compositions. These complex compounds I have found to be substantially insoluble in water, in various aqueous cuprous halide reagents described below, and in hydrocarbon liquids. Said complexes are formed by a thermally reversible chemical reaction, that is, the complexes may be decomposed at elevated temperatures to give the cuprous halide and cyclic olefin originally reacted in substantially theoretical yield.

It is an object of this invention to provide new chemical compounds. Another object is to provide methods of preparing certain new chemical compounds. Another object is to provide solid complex addition compounds of cyclic olefins with cuprous halides, and to provide preferred processes for making the same. Yet another object is to provide proper temperature conditions and effective reagent preparations for reacting cuprous halides, such as the chloride or the bromide, with cyclic olefins. Further objects will be apparent from the following detailed discussion.

The new compounds of this invention are useful for a variety of purposes. For example, they may be used as a source of very pure cyclic olefins and of very pure cuprous halides. They may serve as reagents for various reactions. Furthermore, it is frequently more convenient to handle cyclic olefins in the form of their cuprous halide complexes rather than as the cyclic olefins per se. Cyclic olefins are known to be quite susceptible to oxidation whereby peroxides and the like are formed. I have found that by reacting cyclic olefins with cuprous halides, the complex may be stored, handled, transported, etc., in convenient solid form without serious deterioration until it is desired to utilize the cyclic olefins or the cuprous halide. The complex may then be dissociated by heating. During such storage or transportation, it is only necessary to avoid excessive temperatures or contact with too much moisture. Very small amounts of reducing agents may be incorporated with the complexes if desired.

Reaction of cyclic olefins with cuprous halides may take place under a variety of reaction conditions. The cuprous halide may be simply the solid salt, or it may be supported on or mixed with a carrier material such as fuller's earth, bauxite, pumice, asbestos, etc., if desired, to increase the surface to allow a better contact with the cyclic olefin. Solvents may be used to dissolve the cuprous halide, and the solutions thus formed may then be contacted with the cyclic olefin to accomplish the reaction. Certain olefinic liquids may be used to dissolve the cuprous halide and form a reagent. Suitable reagents may comprise aqueous solutions of cuprous chloride or bromide containing halides of the alkali or alkaline earth metals or ammonia to aid in dissolving the cuprous salts, which are relatively insoluble in pure water.

Aqueous cuprous halide reagents may be basic, neutral, or acidic. I have found that an especially satisfactory reagent can be prepared by dissolving the cuprous halide in a strongly acidified solution containing a non-oxidizing strong mineral acid such as the hydrogen halides, sulfuric acid, or phosphoric acid. These reagents generally provide a somewhat more rapid reaction than is otherwise obtainable. The acid concentration found useful in such reagents may be as high as ten normal, although I prefer to use a solution of from about two to about eight normal acid. In preparing sulfuric acid reagents, the acid is first somewhat diluted in order to avoid any possible oxidizing effect from concentrated sulfuric acid.

It is frequently desirable to use small proportions of inorganic or organic reducing agents such as sodium bisulfite, hydroxylamine hydrochloride, etc., to minimize oxidation of the cuprous salt to the nonreactive cupric state. Use of such agents is more advantageous when nearly neutral or basic aqueous solutions are utilized, since the cuprous salts in strongly acidified solutions are considerably more resistant toward oxidation than in the other solutions just mentioned.

If desired, an excess of solid cuprous salt may be provided with any of the aqueous solutions so that a slurry of solid salt in aqueous liquid is used for contacting with the cyclic olefins.

The cyclic olefins may be contacted either in the vapor or the liquid phase with solid or liquid reagents. Generally, the vapor phase contacting is accomplished by mixing the cyclic olefin with inert gases to produce a gaseous mixture non-condensible at the temperatures maintained for the reaction. This gaseous mixture is then intimately contacted with a solid or liquid reagent to accomplish the formation of the complex.

The liquid phase is usually preferable, in that smaller equipment may be used to form a given quantity of the solid cyclic olefin-cuprous halide complex in a given time. The liquid cyclic olefin and an aqueous solution may be mixed in any satisfactory manner as by use of a turbo-mixer, jet, baffled column, centrifugal pump, etc., with concurrent or countercurrent flow of the two liquids. The reaction is essentially instantaneous, but sufficient mixing time must be allowed to obtain intimate contact between the two liquid phases.

The precipitated complex may be separated from an aqueous reagent and/or from any hydrocarbons which may be unreacted by use of a centrifuge, filter press, or other suitable device. In this way a pure compound may be obtained in the absence of an excess of undissolved cuprous halide if only one cyclic olefin was reacted with one cuprous halide, or mixed compounds may be obtained if more than one cyclic olefin and/or cuprous halide were reacted.

The reaction of cyclic olefins with cuprous halides takes place satisfactorily at temperatures below about 80° F., and a preferred temperature range is from 30 to 45° F., particularly if aqueous reagents are used. The reaction is exothermic, and usually some means of avoiding an excessive temperature rise is provided.

The complexes are decomposed into their components at temperatures of about 125° F. or higher. Accordingly, it is desirable to form and maintain the complexes at temperatures substantially below these decomposition temperatures, unless one wishes to obtain decomposition. If such decomposition is desired, higher temperatures, such as about 200° F. are preferable because of increased decomposition rates at the more elevated temperatures. The rate of decomposition may be increased by maintaining reduced pressures over the complex.

Cyclic olefins and cuprous halides react to form solid crystalline insoluble complexes generally having one formula weight of cyclic olefin combined with two formula weights of cuprous halide, corresponding to the general formula $$R \cdot Cu_2X_2$$

in which R is a cyclo-olefin molecule and X is a halogen atom.

In order to point out the invention more clearly, the following examples are offered to show the method of formation and the characteristics of my new compounds.

*Example I*

A portion of cuprous chloride-cyclopentene complex addition compound was prepared by intimately mixing 20 parts of 96 per cent cyclopentene with 100 parts of a clear cuprous chloride solution prepared from 15 parts ammonium chloride, 78 parts water, 6 parts cuprous chloride, and 1 part sodium bisulfite by weight. These proportions of reactants were chosen to provide a large excess of hydrocarbon relative to the amount of cuprous chloride present, in order to provide ample opportunity for complete saturation of the cuprous chloride. The reaction mixture was vigorously agitated for 12 hours while being maintained at 40° F. At the end of this period the precipitated solid was separated from the aqueous solution and unreacted hydrocarbon and thoroughly dried in an atmosphere of mixed cyclopentene vapor and nitrogen. The solid was a deep cream colored mass in which individual crystals could barely be discerned by the naked eye. A weighed portion of the dried complex was decomposed at 200° F. Analysis indicated that the liberated hydrocarbon was 99+ per cent cyclopentene. An amount of this pure cyclopentene equivalent to 25 per cent by weight of the original complex taken for decomposition was recovered. These results indicate the composition of the addition compound to be $C_5H_8 \cdot Cu_2Cl_2$.

*Example II*

Into a body of liquid cyclohexene maintained at 55° F. was slowly added, with vigorous stirring, a weighed amount of very finely powdered cuprous bromide. A dark yellowish brown granular precipitate was rapidly formed which had the appearance of fine sand or silt. After completion of the addition, the stirring was continued for 30 minutes. The solid complex was then filtered off from the excess unreacted cyclohexene, washed thoroughly with C. P. isopentane, dried in a stream of dry nitrogen, weighed, and then stored in an air-tight bottle. The weight of the recovered material indicated that 98 per cent of the added cuprous bromide was recovered in the form of a compound corresponding to the formula $C_6H_{10} \cdot Cu_2Br_2$, the remaining 2 per cent being unreacted, probably due to occlusion by the complex during the reaction. The bottle containing the complex was stored in a relatively cool place for three months. At that time, the crystals were unchanged in appearance. Upon exposure to moist air for a period of time the crystals took on a somewhat darker hue due to a small amount of complex decomposition which occurred, and oxidation of cuprous bromide to cupric bromide.

My invention is applicable to the formation of cuprous halide complexes with any of the cyclo-olefins such as cyclobutene, cyclopentene, etc., or with substituted cyclo-olefins, particularly those substituted with alkyl groups such as methyl cyclohexene, dimethyl cyclopentene, etc.

Applications of these new compounds and methods of making the same, to the problems of separating cyclic olefins and other components from complex hydrocarbon mixtures are described and claimed in my copending applications Serial Nos. 437,901; 437,902; and 437,904, all filed April 6, 1942.

I claim:

1. A process of preparing solid insoluble complex addition compounds of a hydrocarbon selected from the group consisting of monocyclic mono-olefins and alkyl substitution products of monocyclic mono-olefins with cuprous halides which comprises intimately contacting said hydrocarbon with a cuprous halide at temperatures below about 80° F. and thereby forming said insoluble complex addition compound.

2. The process of claim 1 wherein said hydrocarbon is cyclopentene.

3. The process of claim 1 wherein said hydrocarbon is methyl cyclopentene.

4. The process of claim 1 wherein said hydrocarbon is cyclohexene.

5. A process of preparing solid complex addition compounds of a hydrocarbon selected from the group consisting of monocyclic mono-olefins and alkyl substitution products of monocyclic mono-olefins with cuprous halides which comprises intimately contacting said hydrocarbon with a solution of a cuprous halide dissolved in a strongly acidified aqueous solution of a strong non-oxidizing mineral acid at temperatures below about 80° F. and thereby precipitating said complex addition compound.

6. The process of claim 5 wherein said solution of said acid contains said acid in a concentration of from about two to about eight normal.

7. The process of claim 5 wherein said acid is a hydrogen halide.

8. The process of claim 5 wherein said acid is sulfuric acid.

9. As a new chemical compound, a solid complex addition compound of a hydrocarbon selected from the group consisting of monocyclic mono-olefins and alkyl substitution products thereof with a cuprous halide, said chemical compound being a solid crystalline material, substantially insoluble in hydrocarbons, in water and in aqueous cuprous halide solutions, stable at temperatures below about 80° F., readily decomposable into its components at temperatures above about 125° F., and continuing said hydrocarbon and cuprous halide in equi-molecular proportions.

10. The compound described in claim 9 wherein said hydrocarbon is cyclopentene.

11. The compound described in claim 9 wherein said hydrocarbon is methyl cyclopentene.

12. The compound described in claim 9 wherein said hydrocarbon is cyclohexene.

LLOYD C. MORRIS.